Sept. 21, 1943.    W. F. ZIMMERMANN    2,330,168
HOBBING MACHINE
Filed Aug. 9, 1941    5 Sheets-Sheet 1

FIG.1.

INVENTOR
William F. Zimmermann
Albert F. Nathan
ATTORNEY

Sept. 21, 1943. W. F. ZIMMERMANN 2,330,168
HOBBING MACHINE
Filed Aug. 9, 1941 5 Sheets-Sheet 2

FIG. 2.

INVENTOR
William F. Zimmermann
Albert F. Nathan
ATTORNEY

Sept. 21, 1943. W. F. ZIMMERMANN 2,330,168
HOBBING MACHINE
Filed Aug. 9, 1941 5 Sheets-Sheet 3

FIG. 3.

INVENTOR
William F. Zimmermann
Albert F. Nathan
ATTORNEY

Sept. 21, 1943.  W. F. ZIMMERMANN  2,330,168
HOBBING MACHINE
Filed Aug. 9, 1941  5 Sheets-Sheet 4

INVENTOR
William F. Zimmermann
Albert F. Nathan
ATTORNEY

Sept. 21, 1943.  W. F. ZIMMERMANN  2,330,168
HOBBING MACHINE
Filed Aug. 9, 1941   5 Sheets-Sheet 5

INVENTOR
William F. Zimmermann
Albert F. Nathan
ATTORNEY

Patented Sept. 21, 1943

2,330,168

UNITED STATES PATENT OFFICE 2,330,168

HOBBING MACHINE

William F. Zimmermann, Maplewood, N. J., assignor to Gould & Eberhardt, Newark, N. J., a corporation of New Jersey Application August 9, 1941, Serial No. 406,081

9 Claims. (Cl. 90—4)

This invention relates to a class of machine tools wherein the highest degree of accuracy and precision in the quality and character or work performed thereby is the first essential. A gear hobbing machine may be taken as representative of machines of this kind, particularly gear hobbing machines of the larger sizes having the capacity to operate on gear blanks 12–14 feet in diameter with a face width up to 4 or more feet.

The cutting of the teeth on a blank of such size, requires as many as 60 hours or more of continuous machine operation, and notwithstanding the extreme sturdiness of the machine structure, the high degree of accuracy in the machining and fitting of all of its component parts, certain errors in performance have crept in during such long periods of operation. On careful study of the reasons why such errors were occasioned it was found that the rise and fall in the temperature of the room, the variations in temperature of one or more of the bearings, the warming up of the driving means and the change speed mechanisms, housings, coolant and lubricating mediums, had a pronounced effect upon the constancy of the precision relation of the machine elements and which, to a consequential degree, prevented production of perfect gears.

The primary aim of this invention is to eliminate from the machine such sources of error, and more specially to prevent the generation of heat at the various bearings and by the various driving elements and to prevent the heat that may be developed from reaching or having any appreciable effect upon the precision relation of the coacting elements and members of the machine such as would cause those elements or members to shift in space and thereby produce erratic variations in the precision relation previously determined upon.

When it is recognized that cast iron has a linear expansion coefficient, on the order of .000006 inch per inch per degree change in temperature of the piece and that the temperature in the location where the machine is operating may vary as much as 20 degrees between night operations and day operations, the change in length of a 30 foot machine subjected to such variations in temperature amounts to nearly ½ inch. (.000006 x 12 x 30=.0432 inch.) The change in surface area is approximately twice the linear expansion and the volumetric change is approximately three times the linear expansion.

Such variations are of consequential character, particularly in gear making machinery, and if it be assumed that such changes in length, area, and volume take place uniformly, different parts of the machine, by reason of being made of different materials, undergo similar changes but in differing amounts. This is particularly true in the case of a machine whose main frame is of cast iron but various other parts and shafts thereof are of steel, which latter has a coefficient of linear expansion approximately 15% greater than the of cast iron. Moreover, large masses of the material such as the base of the machine, stanchion, etc. cool or take up heat relatively slowly, as compared with parts of smaller section, and the resulting non-uniform expansion and contraction of the machine elements, introduces additional variables that rendered it practically impossible heretofore to machine a gear that would measure up to the high standards of accuracy now required.

It has also been found that a primary cause of erratic machine performance was due to the heat generated at localized spots such as the various bearings about the machine and in the main transmission mechanism and driving motor or motors. When the machine is first started all of these points and mechanisms are, or may be regarded as, having an even temperature, but as the machine continues operating, such places and mechanisms warm up at different rates and create zones of appreciably higher heat than the temperature existing at other portions of the machine. The heat generated at such zones, reaches by conduction as well as by convection, portions of the main frame and stanchion members and causes such portions to move in space in amounts directly proportionate to the temperature change, causing a tilting and/or leaning of one or more of the main members. After the machine is stopped and and the various drive mechanisms cease functioning and have become cool, the frame members move back or straighten up again and the parts restore themselves to their normal relative positions.

In my copending application Serial No. 304,037, filed Nov. 13, 1939, of which the present application is in part a continuation, there is disclosed a preferred method of constructing and operating a machine tool of this character free from the effects of the heat generated at the main transmission mechanisms. The machine therein is so conceived and constructed that all driving elements, main shafts, gearing and bearings therefor, are located externally of the main frame elements. The heat generated at such regions as the tooling progresses, is not, confined or trapped within portions of the framing but allowed to dissipate in the surrounding moving air. In addition, the invention further proposes a machine structure in which the main change speed mechanisms, clutches, gears, etc. drive motors, coolant pumps and like heat generators, are all constructed as a separate unit, independent of the machine proper, and located at a substantial distance from the main machine. Relatively long lengths of shafting traverse the intervening space and transmit the power from the remotely located gear box to the externally mounted shafting on the main machine. By so separating the main drive mechanisms from the machine and relating the sources of power at a remote distance, the heat generated at such sources has little effect either by conduction (external or internal) or by radiation, upon elements of the main machine whose parts have critical relationships that must be preserved.

Segregation and spacing of heat generating mechanisms from the machine proper, is not alone the complete answer to the problem, and the invention further aims to produce and maintain the conditions about the machine and the conditions inhering in the machine itself, still more stable and invariable thereby to lessen to a still further degree, the possibility of deflection due to temperature variations. A preferred manner of effectuating that objective is to provide an enclosure for each of the separated sections of the machine organization whereby each section is isolated and thermally insulated not only from each other but from the general atmospheric conditions existing in the plant. The enclosure for the main machine and work blank to be operated upon is constructed of insulating material, and provided preferably with double doors so that access to the machine by the operator may be had without creating undue drafts or sudden changes in temperature inside the enclosure. Overhead removable doors, sufficiently large to permit the largest of work blanks to be loaded upon and removed from the machine are also provided.

By so constructing the machine and its enclosure, and by locating one or more air conditioning units in the main enclosure, the temperature and condition of the air about the machine may be controlled and maintained constant within narrow limits. Such shafting and bearings as are necessary to conduct the power from the distantly located power transmission to the ultimate operating elements of the main machine, are as has been indicated above, journaled outside of the main framework of the machine proper, and are maintained at a substantially uniform temperature by the continuous circulation of air and oil maintained at a uniform temperature.

In carrying forward the main objectives of this invention, namely, keeping the temperature of the main machine constant and invariable independently of its driving mechanisms, the invention further proposes to provide a lubricating system and lubricant cooling arrangement so designed that lubricant supplied to the various bearings and gearing, particularly such as are journaled on the main machine, is supplied thereto in a precooled state and is not, moreover, allowed to collect at those regions and be churned to a higher temperature. The pump and reservoir for the oiling system, as in the case of the main drive mechanisms for the cutter, feed, lead and index movements of the machine, is located at a distance from the main frame and its enclosure and provided with independently controlled temperature regulating means. Preferably the lubricant reservoir and system is located adjacent the main transmission housing, and the same system used for controlling the oil temperature, may be used also to control the temperature of the transmission elements. In this way the power transmission mechanisms, which receive lubricant from the same source, are kept at a controlled temperature, and being kept at the desired temperature do not of themselves heat up the oil that is circulated over the moving parts, and which oil is thereafter pumped to bearings, etc. of the main machine.

The enclosure for the segregated power driving transmission elements, oil pumps, lubricant reservoir and like heating agents is constructed similar to the enclosure for the main frame of the machine and provided with independent temperature controlling and humidifying instrumentalities.

The advantages of separate enclosures and separate temperature controlling systems are that it enables the operator to independently control the temperature of the air and rate of circulation of the air in each enclosure to suit the specific requirements, to the end that heat generated in each may be quickly dissipated and the temperature of the parts held more constant. Constancy in the temperature of the shafts leading to the main machine and of the oil pumped to the various moving parts thereof, is particularly essential in order to keep excess heat away from the main machine. In accordance with this invention, the oil is used also as a medium for conducting heat generated at the bearings away from the main machine and it must, therefore, be supplied to such bearings copiously and at a temperature no higher than the controlled temperature of the machine. And it may not be supplied at an appreciably lower temperature than the main machine, for to do so would tend to bring about the opposite condition of machine deflection.

Within the range of accuracy required and demanded today in the finished gear, a relatively small rise in temperature of one or more bearings about the machine has a pronounced effect upon alignment. Actual tests have shown that a rise in temperature of 25° above the room temperature at the individual bearings at the rear side of the cutter stanchion (away from the operator's side) caused that side to become somewhat warmer. In consequence, that side of the stanchion expanded slightly and caused it to lean over as much as .006" in 30 inches. Such leaning threw out the line of movement of the hob a corresponding amount and the resulting error produced in the lead or helix angle of a wide faced gear reached prohibitive proportions.

With the aid of this invention, however, such errors have now been reduced to their very minimum. By segregating the main transmission elements and their prime movers from the machine proper and locating them in separate insulated rooms, each maintained at a constant temperature at least within 1°-2° variation, and by constructing the bearing journals and housings exteriorly of the main machine and as separate units having a minimum of physical contact of their surfaces with main frame members; and by copiously and continuously lubricating such bearings and other moving parts with lubricant of constant temperature, without allowing such lubricant to accumulate or remain for any appreciable time in the bearing journals, it has been found that errors, due to heating of one or more of the parts of the main machine have been effectively eliminated. And provided that such conditions are maintained throughout the course of the tooling operations, which in some cases may take several days and nights continuous running, the gear machined will be as accurate as it is possible to make and will run true and noiseless in its installation.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which.

Figure 1:
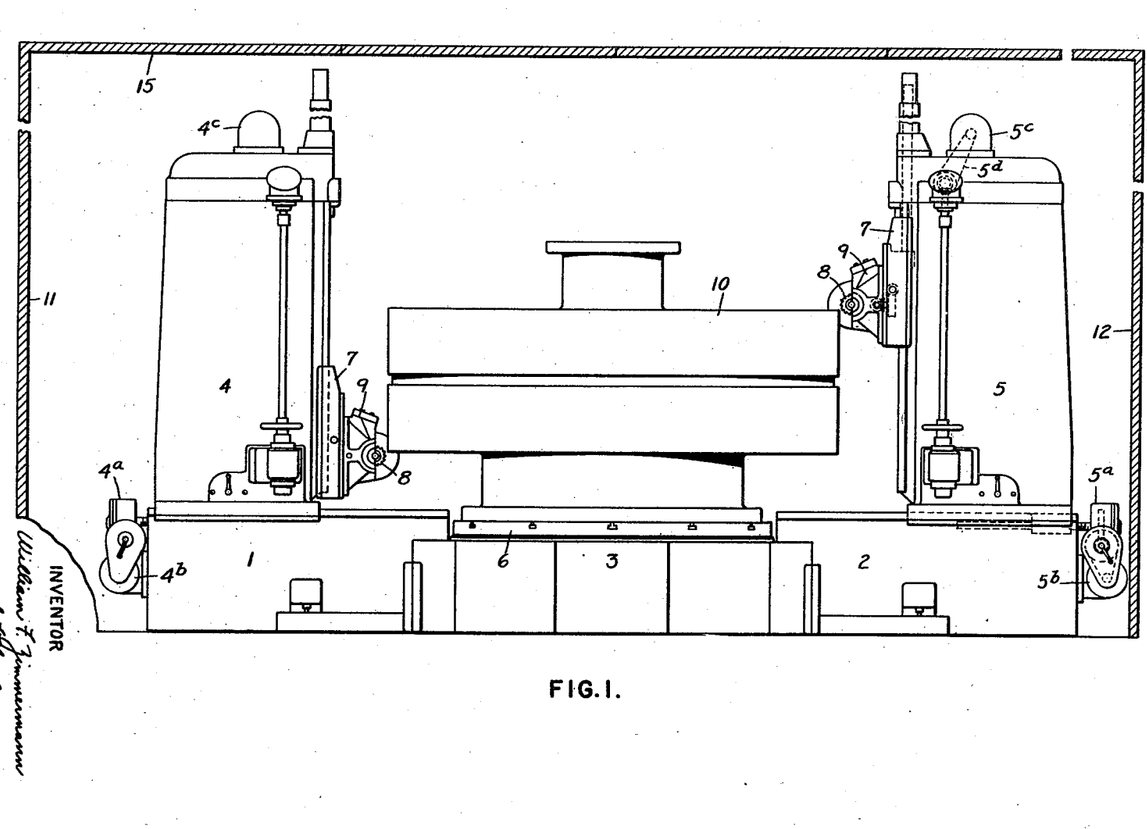
Figure 1 is a side view of a gear hobbing machine having two cutter heads and enclosed in a temperature controlled room.
Figure 2:
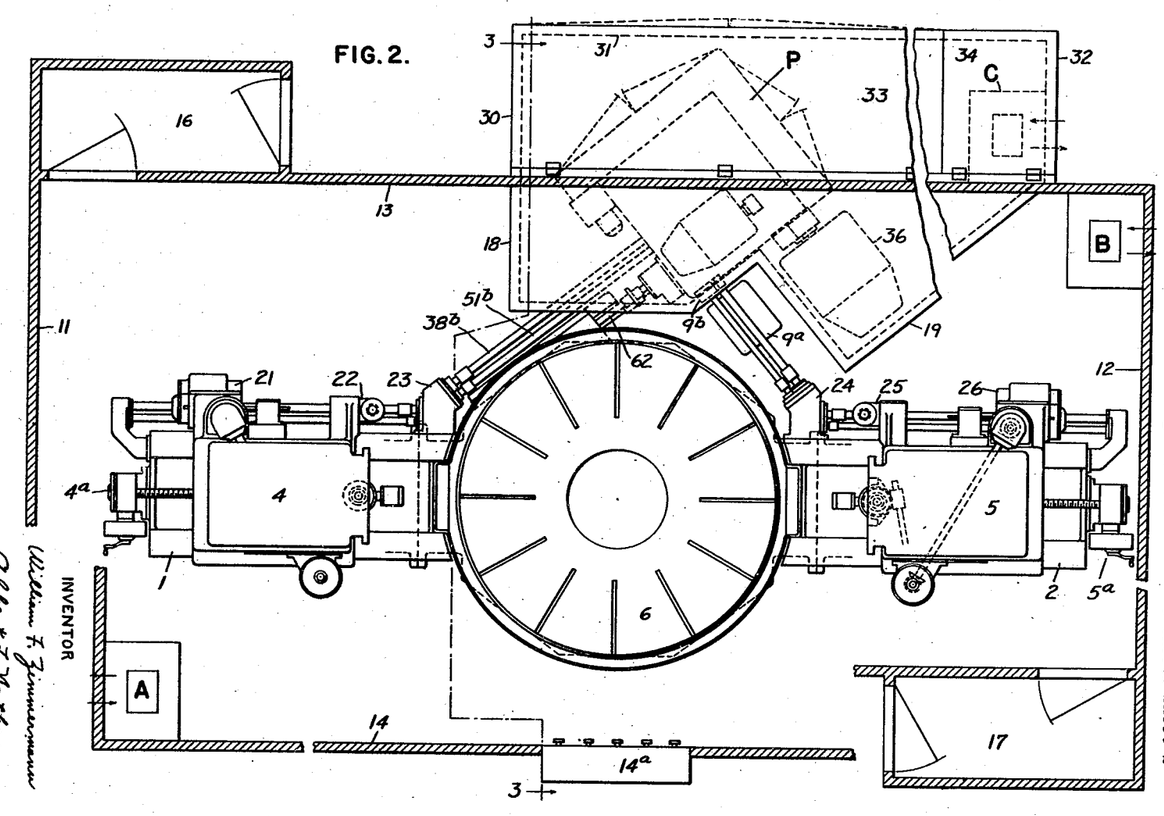
Fig. 2 is a plan view of the machine illustrating more clearly the separate character of the main driving transmission mechanisms and the spaced relation thereof to the main machine.
Figure 3:
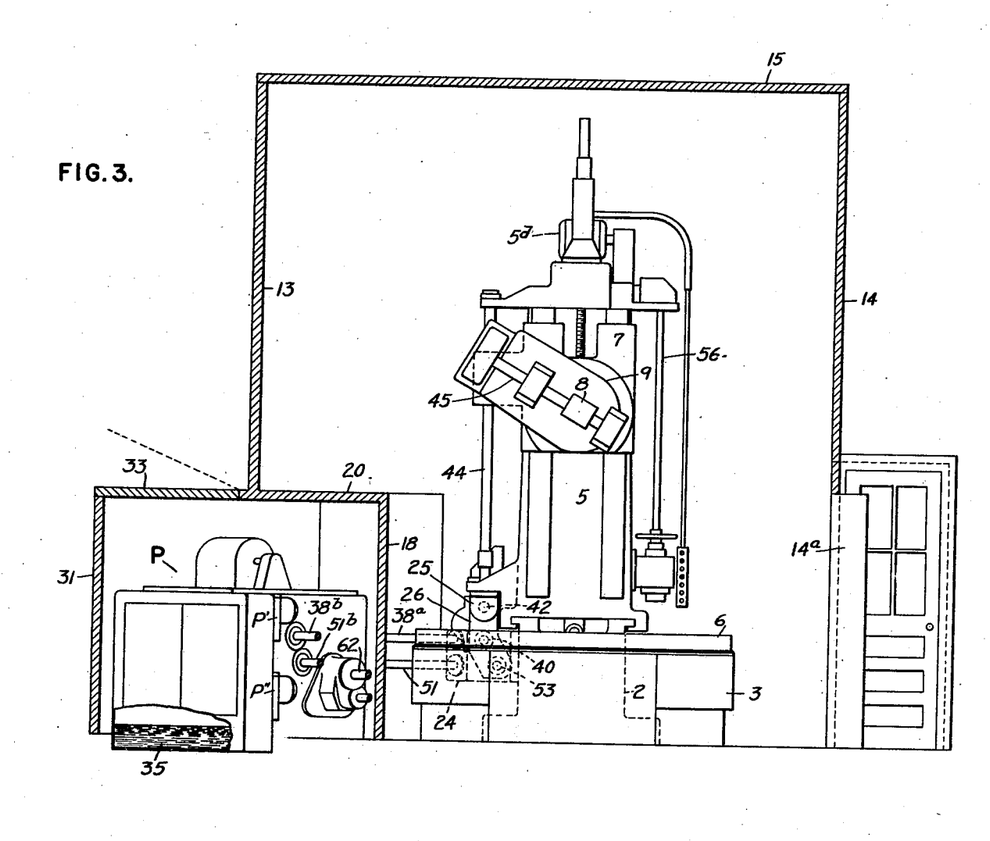
Fig. 3 is a transverse sectional view of the machine and its separate enclosures taken substantially along the line 3—3 of Fig. 2.

Referring more particularly to Figure 1, the hobbing machine disclosed comprises main base members 1, 2, and 3 upon which are mounted respectively vertical stanchion members 4 and 5 and a rotatable work table 6. Each of the stanchions has mounted thereon a tool carriage 7 which supports a rotatable vertically movable cutter 8 mounted in a swivel head 9. The gear blank represented at 10 is adapted to be mounted and centered upon the table 6 in cooperative relation with the tool heads.

In setting up the machine for cutting the teeth on a gear blank, the stanchions 4 and 5 are moved toward the work center until the cutters 8 overextend the work periphery the required tooth depth. Hand or power means indicated at 4ª and 5ª are provided for that purpose. The machine is then started whereupon the cutters while rotating are fed slowly axially of the work blank and the work blank itself is also slowly rotated. After several days and nights of continuous operation in the case of a large gear the respective cutters will have been fed across the face of the gear and have completed the cutting of the teeth on the blank.

In performing the operation of cutting teeth upon a double gear such as represented in Figure 1 of the drawings, one of the cutter heads is arranged to feed downwardly and the other is arranged to feed upwardly. Where the nature of the work requires, however, only one tool head may be employed.

The foregoing briefly explains the nature of the operations to be performed by a machine of this character and if a further explanation is thought desirable reference may be had to my prior application Serial No. 304,037, and to my prior Patents No. 2,211,309 for the construction and operation of the cutter head; No. 2,195,911 and No. 2,195,912 for the construction of work table drive gearing; and to Patents No. 2,183,362 and No. 2,183,363 for work table structures and mountings.

In hobbing a gear 10 ft. or 12 ft. or more in diameter, many hours of continuous operation is required and it has been found that variations in temperature of the machine or parts thereof, as an incident to changes in room temperature, or by the proximity of driving motors and other heat generating mechanisms, have an appreciable effect upon the precision relation between the tool and work, so much so that the large gears, such as are used in marine turbine work, fail to measure up to the standards of accuracy required.

In an effort to overcome the difficulties occasioned by temperature changes it has been found expedient to arrange the main driving mechanisms as a complete unit and to separate same some distance from the main frame of the machine. When so separated a series of relatively long shafts are employed to transmit the power from the separated unit to the machine elements on the main machine. Furthermore, it has been found desirable and helpful to mount all bearings, shafting and gearing that are required on the main machine, to external surfaces of the main machine and in separate brackets, to the end that the heat generated at such points will not be readily conducted or materially affect the main frame and supporting members of the machine proper.

In addition, the machine proper is enclosed entirely within the insulated room or compartment represented by side walls 11, 12, 13, 14, and ceiling wall 15, and in which there is provided one or more air conditioning units A and B for maintaining a continuous circulation of air at a constant temperature about the machine proper. Double door chambers 16 and 17 are provided to permit access to the machine without affecting severe changes in temperature. Additional partition walls 18, 19 and 20 extending around the transmission unit, are also provided to close out the heat generated at such sources from the enclosure surrounding the main machine. By locating and arranging the various machine elements as described above the temperature of the work and machine proper can be maintained constant within narrow limits.

The external mounting and spaced relation of the various running shafts and gears on the main machine provide for free circulation of air therearound and much of the heat generated in the projecting brackets, is dissipated in the moving air currents and hence prevented from reaching the main frame portions of the machine. After long periods of testing and experimentation it was found, however, that still further refinements and improvements were necessary in the means provided and adapted to keep the various elements of the machine at a constant temperature and chief among which was the need for keeping the various bearings and bearing brackets that are attached to the main machine, substantially constant and equal in temperature to the controlled temperature of the main frame.

By way of illustration it was found that the temperature at the various external brackets 21, 22, 23, 24, 25, 26 increased as much as 20° above the room controlled temperature of 75° after the machine had been running 4 to 8 hours. Such increase in temperature particularly at the brackets 21, 22, 25, 26 on the movable stanchion members, had a heat transferring effect upon the main framing and caused the stanchion members to heat slightly on one side only. As such stanchion members extend a considerable distance vertically, in order to provide for a sufficient travel of the cutter carriages for operation on wide faced gears, such one-sided warming of the stanchions caused them to lean to one side and result in an error as much as .006" in 30" in helix angle of the gear.

In an effort to eliminate that source of difficulty it was first decided to allow the various gears and shafting housed in the bearing brackets to run in a bath of oil and while this helped to a marked degree, it did not solve the problem because the oil itself after being churned therein during many hours of machine operation, became heated to the point where it also created a localized heating of the stanchion members causing the latter to lean slightly to one side. Other expedients were resorted to among which were the spacing of the bearing brackets on pads and providing auxiliary fans, but without material success. It was then conceived that by rearranging the lubricant system completely so that precooled oil could be supplied to the bearings copiously and continuously and not allowed to remain for any appreciable time in the various bearing brackets, substantially all of the leaning tendency of the stanchions heretofore experienced could be eliminated.

Figs. 2 to 7 illustrate a preferred method and means for carrying out the foregoing objectives and which in part includes the partition walls 18, 19, 20, previously referred to and outer walls 30, 31, 32, and movable cover elements 33, 34. The walls just referred to are also constructed of insulating material and completely surround the main power transmission mechanism indicated by the letter P. Within this additional enclosure is a third air conditioning unit indicated by the letter C, the purpose and function of which is to maintain the lubricant 35 contained within the transmission unit housing at a predetermined constant temperature as well as to maintain the various motors and gearing in and about the unit at a substantially constant temperature.

Figures 4, 5:
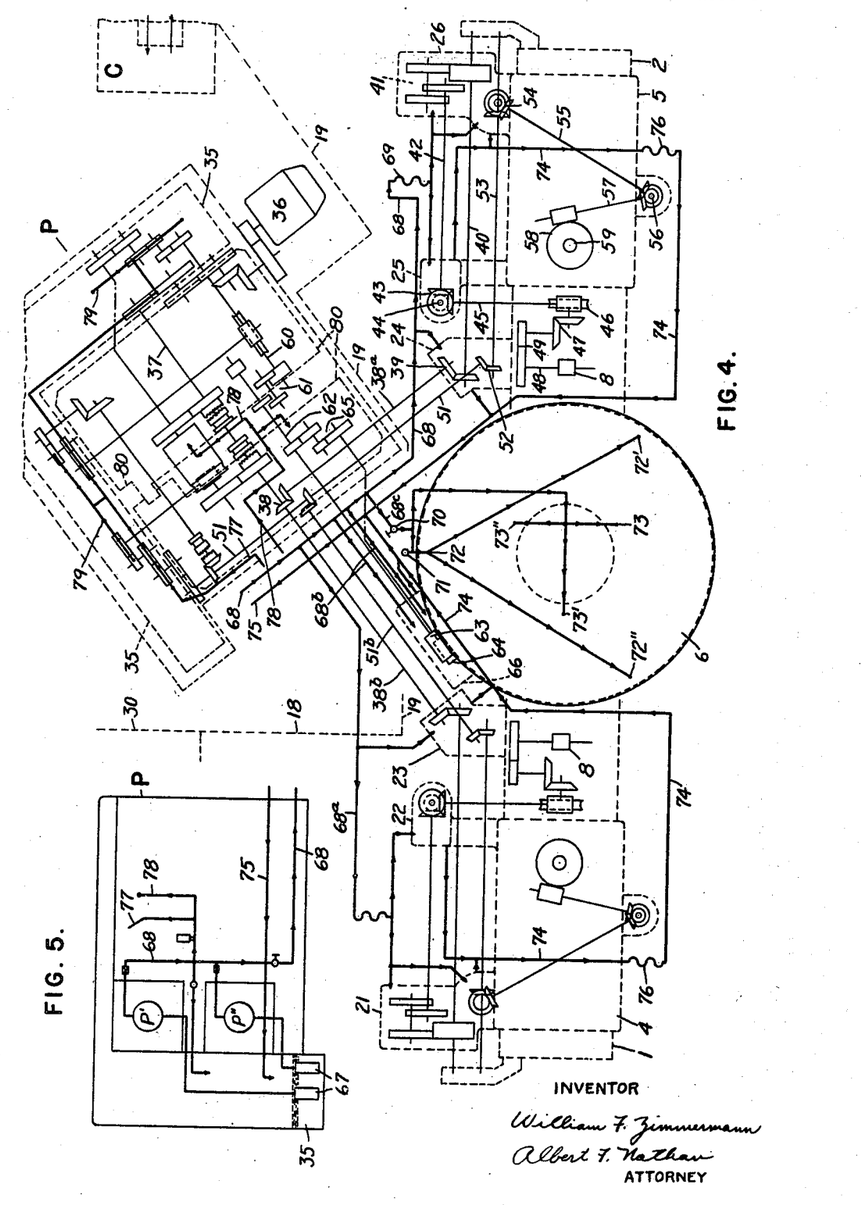
Fig. 4 is a schematic diagram of the drive gearing and lubricating systems.
Fig. 5 is a diagram of the power transmission unit and additional elements of the lubricating systems.

With reference to Fig. 4, the main drive motor is indicated at 36 which transmits the power through the cutter speed gears shown in the drawings to shaft 37. From shaft 37 the power divides at 38 into branch shafts 38ª and 38ᵇ, the former of which leads through the partition wall 19 into the frame mounted bearing bracket 24 of the main frame. Bevel gears 39 conduct the power to a splined horizontal shaft 40 which extends through the bearings bracket 26 on the movable stanchion and is journaled at its end to an external bracket on the main frame. A reversing mechanism 41, within the bracket 26, conveys the power to a shaft 42 which leads into bearing bracket 25. At that point bevel gears 43 transmit the power to the splined vertical shaft 44 and thence to worm shaft 45 journaled in the tool slide. Worm gearing 46 and bevel gearing 47 journaled in the tool slide at its swivel axis, convey the power to the cutter spindle 48 through the gears 49. Through the gearing just explained the hobbing cutter 8 may be driven at the desired speed.

The power for translating and feeding the tool slide vertically is derived from shaft 51 which also leads through the partition wall 19 and into the bearing bracket 24 of the main frame. The branch shaft 51ᵇ leads to the bracket 23 of the main frame at the left of the drawings. Inside the bearing bracket 24 a pair of bevel gears 52 transmit the power to a splined shaft 53 to the bearing bracket 26 at the right hand side of the drawings. Bevel gearing 54 transmits the power to a shaft 55 extending diagonally through the stanchion 5 to a vertically extending shaft 56 journaled externally thereof. At the top of the shaft 56, a second set of bevel gears are provided to transmit the power to a worm shaft 57 which, through worm gearing 58, propels the feed screw 59 that feeds the tool carriage up or down at the required rate of speed.

The table rotating drive is taken from shaft 60 through reversing mechanism 61 to a worm shaft 62. Shaft 62 extends through the partition wall 19 and directly drives one of the table index worms 63. The other table index worm 64 receives power from the same shaft 62, but through a set of speed reducing gears 65. One of the table index worms 63, 64, is a coarse lead worm and is used for roughing purposes and the other is a fine lead worm and used for finishing purposes. They are of the dual lead type and only one is used as the driver at any one time, as is more fully explained in my prior Patents No. 2,195,911 and No. 2,195,912. Both worms are adjustable and journaled in bearings in an external housing 66 secured to the base member 3.

The gearing for the left hand stanchion 4 duplicates that previously explained for the right hand stanchion 5 and need not, it is thought, be explained in further detail.

All main switches and control relays for governing the action of the machine are located away from the machine in a control panel box 14ª which may be built in or attached to the enclosure wall 14 in a position convenient to the operator's normal working station.

The drives herein before explained constitute the main drives to the cutter and work table and normally are in continuous operation. The machine, however, embodies still further power transmissions for effecting a power adjustment of certain of the major elements. For example, stanchion traverse motors 4ᵇ and 5ᵇ secured to the outer ends of the stanchion bases (see Fig. 1) are provided for adjusting the stanchions 4 and 5 toward and from the workpiece. Each of the motors operate through an independent train of mechanism indicated generally as 4ª and 5ª and serve to drive the stanchion feed screw shaft selectively in reverse directions.

Likewise, motors 4ᶜ and 5ᶜ mounted at the top of each stanchion provides an independent drive for quickly raising or lowering the respective tool slides 7. Each of the motors 4ᶜ and 5ᶜ operates through a V belt 5ᵈ to drive the worm shaft 57 and its associated slide elevating mechanism 59. A third motor 9ª is operatively connected, by gearing indicated at 9ᵇ, with the feed shafts 51 and 51ᵇ for traversing both tool carriages simultaneously when desired.

As such motors are used only infrequently and normally are at rest throughout the actual tooling operation, they do not in themselves constitute a heating plant or plants having any material effect upon the machine structure as a whole.

To the end that the main gearing and shafting and other moving parts are continuously adequately lubricated, two complete pumping systems P', P'' are provided as represented in Fig. 5. Each pump takes oil from the reservoir 35 through a strainer 67 and discharges it in copious quantities into the forward pressure line 68. The line 68 leads through the partition wall 19 to the stationary bearing bracket 24 and also to the movable bearing brackets 25 and 26 through a flexible conduit 69. A branch line 68ª conveys lubricant in a similar manner to the bearing brackets 23, 22 and 21 on the left hand stanchion and frame members. Separate additional branch lines 68ᵇ convey lubricant to the table index worm gears 63, 64 and still another branch line 68ᶜ conveys lubricant under pressure to the inner and outer sets of bearings that support the work table 6. In the lines 68ᶜ a regulating valve 70 and pressure gauge 71 are installed so that the pressure under the table may be determined and regulated to avoid lifting. Oil outlet points 72, 72', 72'' are provided under the table as shown in Fig. 4 to lubricate the outer bearings and similarly arranged outlet points 73, 73', 73'' are provided for lubricating the inner bearings of the table.

In order to prevent an entrapment of lubricant in the various external bearing brackets or housings, a return system of piping has been provided which is indicated in Fig. 4 by the reference character 74. The return lines 74 have separate branch connections with each of the bearing brackets 21 to 26, inclusive, and with worm housing 66, which all unite into a common return line 75 that leads directly to the reservoir 35, as illustrated in Fig. 5 of the drawings. Flexible conduits 76 are also provided in the return lines 74 to accommodate movements of the stanchion members.

Figure 6:
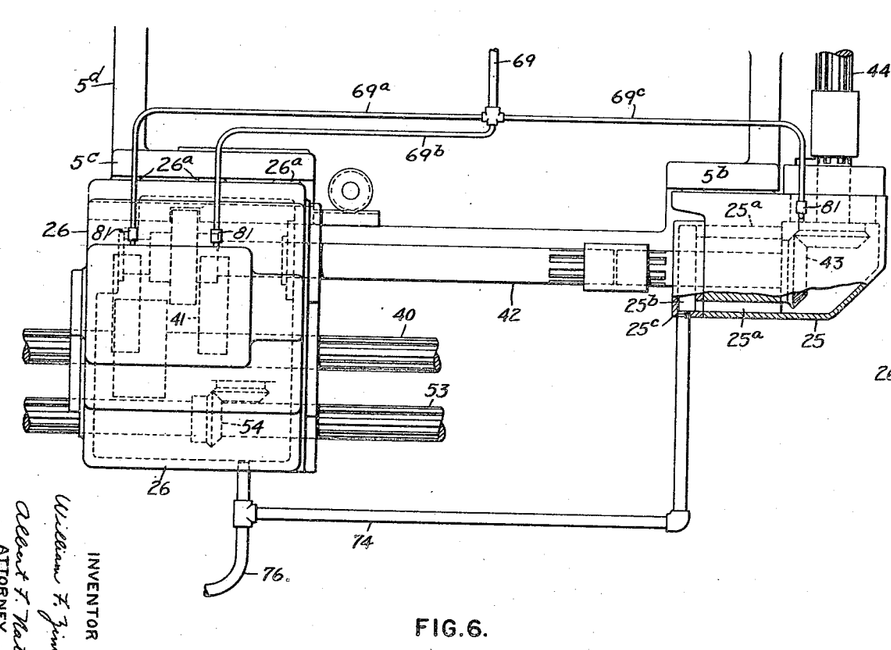
Figs. 6 and 7 are detail views of bearing brackets, illustrating the spatial mounting to the main frame and the forward and return oil line connections.
Figure 7:
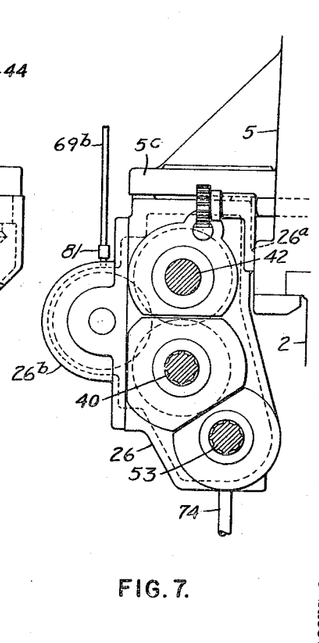

Figs. 6 and 7 of the drawings illustrate more clearly the hollow construction of the stanchion mounted bearing brackets 25 and 26 and a preferred arrangement of the conduits and ports provided to facilitate free circulation of lubricant therethrough.

It will be understood that bearing bracket 24, and likewise bearing brackets 21, 22, 23, and 66 are similarly constructed for free lubricant flow and need not, it is thought, be explained in detail.

With reference to Fig. 6, the bearing bracket 26 is substantially hollow and is secured to the underside of a flange 5ᶜ extending laterally from the movable stanchion 5. A series of small pads 26ª surround each connecting bolt that serve to maintain the major portion of the bearing bracket spaced away from the stanchion to afford air circulation therebetween and to minimize the transfer of heat.

To the outer side of the bearing bracket, a cover 26ᵇ is secured, and into the upper wall of which, oil lines 69ª and 69ᵇ are connected for the passage of a copious supply of lubricant. The lubricant enters the bracket interior, and the moving gears and shafting therein insure that the lubricant reaches all vital parts and bearings. The bracket is provided with oil seals about the various shafts 40, 42, and 53 extending therefrom and the otherwise confined lubricant falls to the bottom of the bracket and is quickly conducted away to the distant reservoir through pipe connection 74, flexible hose 76, and return line 75.

The bearing bracket 25 is similarly mounted in spaced relation to a lateral flange 5ᵈ of the stanchion and has a branch connection 69ᶜ with the pressure lubricant supply line 69. The supply of lubricant first enters the cavity surrounding the cutter drive bevel gears 43 and insures adequate lubrication of the gears and their shaft bearings. The return of lubricant to the reservoir is through ports 25ª spaced about the bearing of shaft 42, to a collecting chamber 25ᵇ formed in a cover 25ᶜ. The cover in turn has the oil return line 74 connected therewith at its lowest point.

In this system of free flow of lubricant through the various bearing brackets, the brackets become, in effect, expanded portions of the pressure lines, through which lubricant is continually flowing. And as the oil comes to the bearings at a temperature equal to that maintained about the main machine, it does not, of course, cause unwanted heating or chilling effects.

To make certain that each bearing bracket and each branch pressure line connected therewith is receiving and passing the lubricant, each branch line, preferably at its point of connection with the bearing bracket or housing, is provided with a transparent section 81 through which the attendant may visually inspect the flow in each part of the system.

Also leading out of the common supply line 68 (Fig. 5) are two supply conduits 77 and 78 which lead to various regions overlying the transmission mechanisms in the unit P. Supply line 77 conveys oil to a system of perforated drip tubes 79 overlying the cutter feed, lead, and table index change speed gearing, whereas, supply line 78 conveys lubricant to perforated drip pans 80 overlying the various gearing and moving parts which are permanently housed within the main portions of the gear box.

Oil that is allowed to drip over the moving parts of the transmission unit P finds its way to the reservoir 35 located at the bottom and on two sides thereof and in so doing is to some extent maintained at a constant temperature by a contact with parts which are also maintained at a predetermined temperature by reason of the action of the air conditioning unit C which keeps that entire enclosure at a uniform temperature. In the embodiment illustrated, the reservoir 35 has a capacity of approximately 30 gallons of oil and as a substantial portion thereof always remains in the reservoir and is continuously subjected to the controlled temperature of the enclosure, the oil fraction returning from various other portions of the machine and which may be slightly warmer, has little or no effect whatever upon the temperature of the large volume that remains. With the lubricating system so conceived it will be apparent oil supplied to the various elements of the main machine is supplied in the first instance at a temperature at least no higher than the temperature maintained in and about the main machine. Hence, bearing members and other critical regions of the main machine do not have "hot" oil fed to them and inasmuch as the present system provides for the continuous removal of oil supplied to the critical zones or regions, none of the precooled oil so supplied is allowed to become heated up by churning in or at those regions. The net result being that any tendency of one or more of the bearings to heat up above the controlled temperature of the main machine and its enclosure is at once counteracted by the continuous circulation of copious quantities of oil at a controlled temperature through such bearings. Furthermore, such circulating oil tends to absorb excess heat and carries it back to the main reservoir for dissipation.

In the manner above set forth the main machine and the workpiece to be operated upon is kept at an unvarying temperature (approximately 75°) completely independently of its driving means and mechanisms. Also, the main driving mechanisms including all drive motors, change speed gearing, clutches, shafting and differential mechanisms are insulated from the main machine and completely enclosed in a separate compartment, the temperature of which is likewise maintained a predetermined constant value independently of the main machine. This segregation and independent control of the hobbing machine proper and its drive, in combination with a lubricating system wherein the oil supplied to bearings on the main machine, is supplied at a constant temperature and quickly drawn off and returned to a large reservoir outside of the main enclosure for cooling and subsequent recirculation, has rendered a machine so constructed practically constant and invariable in its action throughout long periods of continuous operation.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A machine tool in which distortion of elements thereof due to heating introduces errors in the work combining a main frame adapted to support a workpiece and a tool in cooperative relation; a separate and distantly spaced main driving transmission having change speed gearing embodied therein for determining the relative rates of speed and feed movements between said tool and workpiece to perform a tooling operation; power shaft connections between said housing and said tool; a normally completely closed insulated enclosure for the main frame, tool, and workpiece of the machine, said insulated enclosure excluding the said driving transmission thereby to isolate said frame and parts supported thereon from the heat generated at said transmission; and means for conditioning the atmosphere within the enclosure to maintain the machine at a uniform constant temperature throughout a tooling operation.

2. A machine tool in which distortion of the members due to temperature variations creates errors in the finished work combining a main frame adapted to support a workpiece and a tool in cooperative precision relation; a separate and distantly spaced main power transmission unit embodying a main drive motor for effecting relative movement between said tool and workpiece to perform a tooling operation, said distantly spaced unit also embodying tool and workpiece rate selecting and determining mechanisms, power connections traversing the distance between said main frame and said spaced transmission unit; and means for maintaining said main frame unaffected by temperature changes at said power transmission unit by the motor and rate selecting and determining mechanisms thereof comprising a partition wall of insulating material interposed between said main frame and said transmission unit for shielding the former against heat generated at the latter.

3. A precision machine tool in which non-uniform variations in the temperature of relatively movable parts and members thereof produce errors in the workpiece being machined thereon combining a main machine adapted to mount a workpiece and a tool in cooperative tooling relation, power transmission mechanisms including a main drive motor and tooling rate determining means for effecting power movements between the tool and the work during the performance of the tooling operation, said power mechanisms being separate from and situated at a remote distance from the said main machine; a thermally insulated enclosure for the main machine, said power transmission means being located entirely exteriorly of said enclosure, relatively long shaft means extending from said power means through said enclosure to said main machine for driving same; and means for maintaining the temperature of all portions of the machine and workpiece within the said enclosure at a substantially constant value throughout the tooling operation independently of the temperature of said power transmission means.

4. A machine tool combining main frame members including a work support and a tool support; power transmission means including change speed gearing for effecting power movements between said work and tool supports during the performance of the tooling operation, said power transmission being constructed as a separate unit and located at a distance physically spaced from said main frame members, relatively long shaft members for transmitting power from said spaced unit to said main frame members, a lubricating system for the moving parts of said main members including a reservoir and a pump also located in said distant transmission unit, oil conduits leading from said pump to said main machine members and back to said reservoir, an enclosure for said power transmission unit and said oil reservoir and pump means thermally isolating same from the main machine, and means for maintaining the temperature within said enclosure at a predetermined constant value thereby to insure delivery of lubricant to said main members also at a predetermined constant temperature.

5. A gear hobbing machine combining main frame members including a work support and a tool support; power transmission means for effecting power movements between said work and tool supports during the performance of the tooling operation, said power transmission including speed, feed and index gearing for the tool and work support and being constructed as a separate unit and located at a distance physically spaced from said main frame members and connected to the latter through relatively long power shaft connections, a lubricating system for the moving parts on said main frame members including a reservoir and a pump also located at a distance physically spaced from said main frame members, oil conduits leading from said pump to the movable parts on said machine members and to said power transmission mechanisms, and means for controlling and maintaining the temperature of the oil supplied by said pump to the movable parts of said main frame members at a predetermined constant value thereby to insure against undue heating of said main members at localized zones.

6. A gear hobbing machine tool combining main machine members including a work support and a tool support; power transmission means for effecting power movements between said work and tool supports during the performance of the tooling operation, said powed transmission including speed, feed and index gearing and being constructed as a unit and located at a distance and physically spaced from said main frame members, relatively long shaft members for transmitting power from said spaced apart unit to said main frame members, an insulating enclosure for said main machine members, means for maintaining the temperature of all portions of the said main machine and workpiece within the said enclosure at a substantially constant value throughout the tooling operation, an additional enclosure means surrounding said power transmission mechanisms and isolating same from the said main machine, a lubricating system for moving parts of said main machine members including a reservoir and a pump located adjacent said separated transmission unit, oil conduits leading from said pump to movable elements on said main machine members and a second set of conduits leading back to said reservoir, and means for maintaining the temperature within said respective enclosures at a predetermined constant value thereby to maintain said main machine member at a constant temperature and to insure delivery of lubricant to the movable elements on said main members also at a predetermined temperature at least no higher than the controlled temperature of said main machine.

7. A precision machine tool in which variations in the temperature of relatively movable parts and members thereof during tooling operations cause deflection and produce errors in the work being machined, combining a main machine adapted to mount a workpiece and a tool in cooperative tooling relation, power transmission mechanisms including a main drive motor and rate determining mechanisms for effecting power movements between the tool and the work during the performance of the tooling operation, said power mechanisms being constructed as a unit physically separate from and situated at a remote distance from the said main machine; a thermally insulated enclosure for said power transmission mechanisms, relatively long shaft means extending from said power transmission mechanisms through said enclosure and traversing the intervening space to said main machine for driving same, and means including said enclosure for maintaining the temperature of the said main machine at a substantially constant value throughout the tooling operation irrespective of the heat generated by the motor and mechanisms within the said enclosure.

8. A precision machine tool in which the temperature of relatively movable parts and members thereof are to be maintained invariable combining a main machine adapted to mount a workpiece and a tool in cooperative tooling relation, power transmission mechanisms including a main drive motor for effecting power momements between the tool and the work during the performance of the tooling operation; a lubricating system including a motor driven pump and a reservoir separate from and situated at a remote distance from the said main machine; a thermally insulated enclosure for the main machine; said power transmission mechanism including said drive motor, and the said pump and reservoir of said lubricating system being located exteriorly of said enclosure; and separate means for maintaining the temperature of said pump and reservoir at a predetermined temperature value independently and irrespective of the temperature within said first enclosure thereby to insure delivery of oil to elements of the main machine at a constant temperature value throughout the tooling operation.

9. The combination set forth in claim 3 including an additional enclosure means surrounding said power transmission mechanisms and isolating same from the said main machine, and separate means for maintaining the temperature of said additional enclosure and the mechanisms therein at a constant value independently of and irrespective of the temperature maintained within said first enclosure.

WILLIAM F. ZIMMERMANN.